United States Patent
Wissing et al.

(10) Patent No.: US 11,718,300 B2
(45) Date of Patent: Aug. 8, 2023

(54) METHOD AND CONTROL UNIT FOR A SYSTEM FOR CONTROLLING A MOTOR VEHICLE

(71) Applicant: ZF Automotive Germany GmbH, Alfdorf (DE)

(72) Inventors: Christian Wissing, Wesel (DE); Manuel Schmidt, Dortmund (DE); Andreas Homann, Dortmund (DE); Christian Lienke, Dortmund (DE); Torsten Bertram, Düsseldorf (DE); Carlo Manna, Genk (BE); Karl-Heinz Glander, Monheim (DE)

(73) Assignee: ZF AUTOMOTIVE GERMANY GMBH, Alfdorf (DE)

(*) Notice: Subject to any disclaimer, the term of this patent is extended or adjusted under 35 U.S.C. 154(b) by 436 days.

(21) Appl. No.: 16/797,083

(22) Filed: Feb. 21, 2020

(65) Prior Publication Data
US 2020/0269843 A1 Aug. 27, 2020

(30) Foreign Application Priority Data
Feb. 27, 2019 (DE) ...................... 10 2019 107 973.3

(51) Int. Cl.
G05D 1/00 (2006.01)
B60W 30/18 (2012.01)
B60W 50/00 (2006.01)

(52) U.S. Cl.
CPC .. *B60W 30/18163* (2013.01); *B60W 50/0098* (2013.01); *B60W 2050/0052* (2013.01); *B60W 2552/10* (2020.02)

(58) Field of Classification Search
None
See application file for complete search history.

(56) References Cited

U.S. PATENT DOCUMENTS

| | | | |
|---|---|---|---|
| 8,605,947 B2* | 12/2013 | Zhang | G08G 1/167 348/148 |
| 8,903,588 B2* | 12/2014 | Schmudderich | G06V 20/588 701/96 |
| 10,394,243 B1* | 8/2019 | Ramezani | G05D 1/0214 |
| 10,860,025 B2* | 12/2020 | Cunningham | G05D 1/0246 |

(Continued)

FOREIGN PATENT DOCUMENTS

| | | |
|---|---|---|
| DE | 102012009297 | 12/2012 |
| DE | 102014203752 | 9/2015 |

*Primary Examiner* — Jonathan M Dager
(74) *Attorney, Agent, or Firm* — Tarolli, Sundheim, Covell & Tummino L.L.P (57) ABSTRACT

A method for controlling a motor vehicle (10) traveling on a roadway (12) in a current lane (14) is described, wherein the roadway (12) has at least one additional lane (16) that is adjacent to the current lane (14) of the motor vehicle (10). The method has the following steps: Multiple different driving maneuvers are generated and/or received. At least two driving maneuver classes that are defined based on at least one characteristic variable of the driving maneuvers are determined, wherein the driving maneuvers of various driving maneuver classes differ by at least one characteristic variable. The driving maneuvers are classified in one of the at least two driving maneuver classes. In addition, a control unit (30) for controlling a motor vehicle (10) is described.

16 Claims, 5 Drawing Sheets

(56) References Cited

U.S. PATENT DOCUMENTS

| | | | |
|---|---|---|---|
| 10,940,863 B2* | 3/2021 | Palanisamy | G06N 3/045 |
| 11,163,304 B2* | 11/2021 | Iwamoto | G05D 1/0088 |
| 11,209,284 B2* | 12/2021 | Hwang | B60W 30/0956 |
| 11,243,532 B1* | 2/2022 | Levihn | G06N 3/045 |
| 11,282,273 B2* | 3/2022 | Horowitz | G06T 7/194 |
| 11,580,859 B1* | 2/2023 | Aine | G05D 1/0088 |
| 2009/0125221 A1* | 5/2009 | Estkowski | G08G 5/045 |
| | | | 701/120 |
| 2015/0224987 A1* | 8/2015 | Tachibana | G08G 1/166 |
| | | | 701/1 |
| 2017/0108865 A1* | 4/2017 | Rohde | B60W 50/029 |
| 2017/0268873 A1* | 9/2017 | Jouanet | G01B 21/20 |
| 2018/0089563 A1* | 3/2018 | Redding | G06N 3/006 |
| 2018/0120843 A1* | 5/2018 | Berntorp | G05D 1/0212 |
| 2018/0345958 A1* | 12/2018 | Lo | G08G 1/096725 |
| 2019/0049970 A1* | 2/2019 | Djuric | B60W 60/00276 |
| 2019/0250622 A1* | 8/2019 | Nister | B60W 60/0027 |
| 2019/0346854 A1* | 11/2019 | Slutsky | G01S 13/931 |
| 2019/0369637 A1* | 12/2019 | Shalev-Shwartz | G06V 20/56 |
| 2020/0050214 A1* | 2/2020 | Goehl | G08G 1/167 |
| 2020/0182627 A1* | 6/2020 | Morcom | G06F 16/29 |
| 2020/0301434 A1* | 9/2020 | Manna | G05D 1/0217 |
| 2020/0317192 A1* | 10/2020 | Awane | B62D 15/025 |
| 2020/0361489 A1* | 11/2020 | Park | B60W 50/0097 |
| 2021/0009126 A1* | 1/2021 | Yashiro | B60W 30/143 |
| 2021/0016778 A1* | 1/2021 | Yashiro | B60W 30/18163 |
| 2021/0020045 A1* | 1/2021 | Huang | G01C 21/3804 |
| 2021/0061278 A1* | 3/2021 | Zhao | B60W 40/06 |
| 2021/0078595 A1* | 3/2021 | Magzimof | G07C 5/008 |
| 2021/0108936 A1* | 4/2021 | Seegmiller | B60W 60/0015 |
| 2021/0114620 A1* | 4/2021 | Yu | B60W 60/0025 |
| 2021/0148726 A1* | 5/2021 | Ostafew | G05D 1/0088 |
| 2022/0063618 A1* | 3/2022 | Yasui | B60W 40/04 |
| 2022/0234614 A1* | 7/2022 | Frazzoli | G06N 5/01 |
| 2022/0234618 A1* | 7/2022 | Kabzan | B60W 30/09 |

* cited by examiner

Fig. 7

METHOD AND CONTROL UNIT FOR A SYSTEM FOR CONTROLLING A MOTOR VEHICLE

RELATED APPLICATION

This application claims priority from German Application No. 10 2019 104 973.3, filed Feb. 27, 2019, the subject matter of which is incorporated herein by reference in its entirety.

BACKGROUND OF THE INVENTION

The invention relates to a method for controlling a motor vehicle, a control unit for a system for controlling a motor vehicle or for a motor vehicle, a motor vehicle, and a computer program for carrying out the method.

One of the main challenges for driving assistance systems that control a longitudinal motion and a transverse motion of a motor vehicle in a partially automated manner, and in particular for motor vehicles that travel in a completely automated manner, is to analyze a specific situation that the motor vehicle is in, and based on this analysis to derive appropriate, meaningful driving maneuvers for the motor vehicle.

The complexity in computing the driving maneuvers generally increases with the duration of the individual driving maneuvers. If various possible driving maneuvers are to be determined for a fairly long time period, for example longer than three seconds, or if complex driving maneuvers with multiple lane changes are involved, previously known methods are often not able to determine these in real time.

SUMMARY OF THE INVENTION

The object of the invention, therefore, is to provide a method and a system for controlling a motor vehicle which represent an improvement over the disadvantages of the prior art.

The object is achieved according to the invention by a method for controlling a motor vehicle traveling on a roadway in a current lane, the roadway having at least one additional lane that is adjacent to the current lane in which the motor vehicle is traveling. The method has the following steps: Multiple different driving maneuvers are generated and/or received. At least two driving maneuver classes that are defined based on at least one characteristic variable of the driving maneuvers are determined, wherein the driving maneuvers of various driving maneuver classes differ by at least one characteristic variable. The driving maneuvers are classified in one of the at least two driving maneuver classes.

Here and in the following discussion, "driving maneuver" is always understood to mean a corresponding space-time trajectory that describes the driving maneuver in a coordinate system generally having two spatial dimensions and one time dimension.

The driving maneuver classes are thus defined in each case by a set of characteristic variables. The characteristic variables are variables that describe the essential features of the particular driving maneuver.

Thus, by use of the method according to the invention, the task of selecting an appropriate driving maneuver for the motor vehicle is transformed into a classification of the driving maneuvers. Such classification tasks are achievable in a particularly rapid and reliable manner using methods of machine learning, for which reason even fairly complex driving maneuvers having a fairly long duration may be determined and selected in real time with the method according to the invention.

The driving maneuver classes are preferably disjunct; i.e., each driving maneuver can be associated with only one driving maneuver class. Accordingly, driving maneuvers from two different driving maneuver classes differ by at least one characteristic variable, or even by all characteristic variables. Driving maneuvers within a driving maneuver class may differ in one characteristic variable, but not in all characteristic variables.

Conversely, the characteristic variables of the individual possible driving maneuvers that are obtained may be determined in order to classify the driving maneuvers in the various driving maneuver classes.

The at least one characteristic variable preferably includes at least one traffic sequence that indicates the time sequence of traveling past and/or overtaking by other road users. "time sequence" is understood to mean that the traffic sequence includes the precise points in time at which the other road users are traveling past or overtaking, and/or that the traffic sequence includes a time sequence of the individual events.

One aspect of the invention provides that the at least one traffic sequence includes an overtaking sequence, wherein the overtaking sequence includes at least one point in time at which the motor vehicle is overtaking a further road user. The overtaking sequence may also include multiple points in time at which the motor vehicle is in each case overtaking a further road user. In other words, the overtaking sequence indicates the time sequence and/or the precise points in time at which the motor vehicle is overtaking further road users.

According to another aspect, the overtaking sequence includes multiple time-ordered points in time at which the motor vehicle is in each case overtaking a further road user. Accordingly, the overtaking sequence precisely indicates the particular time sequence in which the individual further road users are being overtaken by the motor vehicle.

In another embodiment of the invention, the at least one traffic sequence includes a passing-by sequence, wherein the passing-by sequence includes at least one point in time at which a further road user is traveling past the motor vehicle in the opposite direction or in the travel direction. The passing-by sequence may also include multiple points in time at which a further road user is in each case traveling past the motor vehicle. In other words, the passing-by sequence indicates the time sequence and/or the precise points in time at which the particular further road user is traveling past the motor vehicle. There are two types of "being traveled past." Either the particular further road user is traveling past the motor vehicle in the travel direction of the motor vehicle, i.e., is overtaking the motor vehicle, or the particular further road user is traveling past the motor vehicle, opposite the travel direction of the motor vehicle.

One aspect of the invention provides that the passing-by sequence includes multiple time-ordered points in time at which a further road user is in each case traveling past the motor vehicle in the opposite direction or in the travel direction. Accordingly, the passing-by sequence precisely indicates the particular time sequence in which the individual further road users are traveling past the motor vehicle, the passing-by sequence preferably also indicating whether the individual further road users are traveling past the motor vehicle in the travel direction or opposite the travel direction of the motor vehicle.

The at least one characteristic variable preferably includes information concerning a lane in which the motor vehicle is situated after completion of the driving maneuver. In particular, the at least one characteristic variable includes information concerning whether the motor vehicle is once again situated in the current lane, in the additional lane, or optionally in another lane after completion of the driving maneuver.

According to one embodiment of the invention, the at least one characteristic variable includes a driving maneuver parameter, wherein the driving maneuver parameter contains information at least concerning whether the motor vehicle is overtaking the at least one further road user on the left, is overtaking the at least one further road user on the right, is traveling behind the at least one further road user, is traveling in front of the at least one further road user, or whether the at least one further road user is traveling past the motor vehicle, in particular the driving maneuver parameter containing information concerning whether the at least one further road user is traveling past the motor vehicle in the travel direction or opposite the travel direction of the motor vehicle.

The driving maneuver parameter preferably includes this information for all further road users that are situated in predefined surroundings of the motor vehicle.

A further aspect provides that a homotopy analysis of the multiple driving maneuvers is carried out in order to assign the multiple driving maneuvers to a driving maneuver class and/or to determine the driving maneuver parameter. More precisely, a homotopy analysis of the space-time trajectories corresponding to the multiple driving maneuvers is carried out.

In particular, those driving maneuvers whose associated space-time trajectories are homotopic relative to one another are classified in the same driving maneuver classes, while driving maneuvers whose associated space-time trajectories are not homotopic relative to one another are classified in different driving maneuver classes.

A further aspect provides that for the homotopy analysis, a space-time trajectory is associated with each obstacle on the roadway. In addition, a hypothetical current having a predefined current intensity is sent through each of the space-time trajectories of the obstacles, the current intensity being the same for all space-time trajectories of the obstacles. For the space-time trajectories, which in each case correspond to a driving maneuver, the so-called "h signature" is then determined, which as a line integral is defined via the magnetic field, generated by the hypothetical currents, along the particular space-time trajectory of the driving maneuver. Driving maneuvers having space-time trajectories with the same h signature are classified in the same driving maneuver class.

The obstacle is a further road user or some other type of obstacle, for example a construction site.

According to another embodiment of the invention, the multiple different driving maneuvers are generated randomly, pseudorandomly, and/or based on a predefined probability distribution. The motor vehicle is represented as a point mass, and accelerations of this point mass are simulated. In the process, obstacles such as the further road users are taken into account. In particular, the obstacles are taken into account at least insofar as the space-time trajectories of the motor vehicle and the space-time trajectories of the obstacles must not intersect or touch.

In particular, a diffusion strategy is used in generating the multiple driving maneuvers. When the driving maneuvers are generated, those space-time trajectories already having a large number of other space-time trajectories in their vicinity are suppressed. In other words, this diffusion strategy also generates space-time trajectories, and thus, driving maneuvers, in areas in the X-Y-t coordinate system that are less densely populated by driving maneuvers. Greater diversity of the driving maneuvers is thus achieved.

In particular, at least the current lane and/or the at least one additional lane are/is transformed into a Frenet-Serret coordinate system. In this coordinate system each roadway is free of curves, so that each traffic situation may be handled in the same way, regardless of the actual course of the roadway.

The multiple different driving maneuvers and/or the driving maneuver classes may be filtered based on predefined criteria, in particular based on at least one feasibility criterion, at least one comfort criterion, and/or at least one safety criterion. One example of a feasibility criterion is whether the motor vehicle can even reach a certain space-time region based on a maximum acceleration or a maximum deceleration of the motor vehicle. One example of a comfort criterion is whether the acceleration in the longitudinal and/or transverse direction exceeds a predefined limit value which, based on experience, is perceived as uncomfortable by the vehicle occupants. One example of a safety criterion is a minimum distance to be maintained from other road users, or a speed limit.

The criteria, in particular the at least one comfort criterion, are/is preferably adaptable by the user and/or as a function of a selected driving mode of the motor vehicle. Thus, in a sport mode, the predefined limit value for the longitudinal and/or transverse acceleration could be higher than in a standard driving mode.

According to another aspect, one of the possible driving maneuvers is selected, in particular based on the classification, and the motor vehicle is controlled according to the selected driving maneuver. The motor vehicle is controlled at least partially automatically, in particular completely automatically, based on the selected target driving maneuver.

The object is further achieved according to the invention by a control unit for a system for controlling a motor vehicle or for a motor vehicle, the control unit being designed to carry out a method described above. With regard to the advantages and features, reference is made to the above discussion concerning the method, which correspondingly also applies to the control unit.

The object is further achieved according to the invention by a motor vehicle having an above-described control unit. With regard to the advantages and features, reference is made to the above discussion concerning the method, which correspondingly also applies to the motor vehicle.

The object is further achieved according to the invention by a computer program having program code means for carrying out the steps of a method described above when the computer program is executed on a computer or a corresponding processing unit, in particular a processing unit of a control unit described above. With regard to the advantages and features, reference is made to the above discussion concerning the method, which correspondingly also applies to the computer program.

BRIEF DESCRIPTION OF THE DRAWINGS

Further advantages and characteristics of the invention result from the following description and the appended drawings, to which reference is made. In the drawings.

DESCRIPTION

Figure 1:
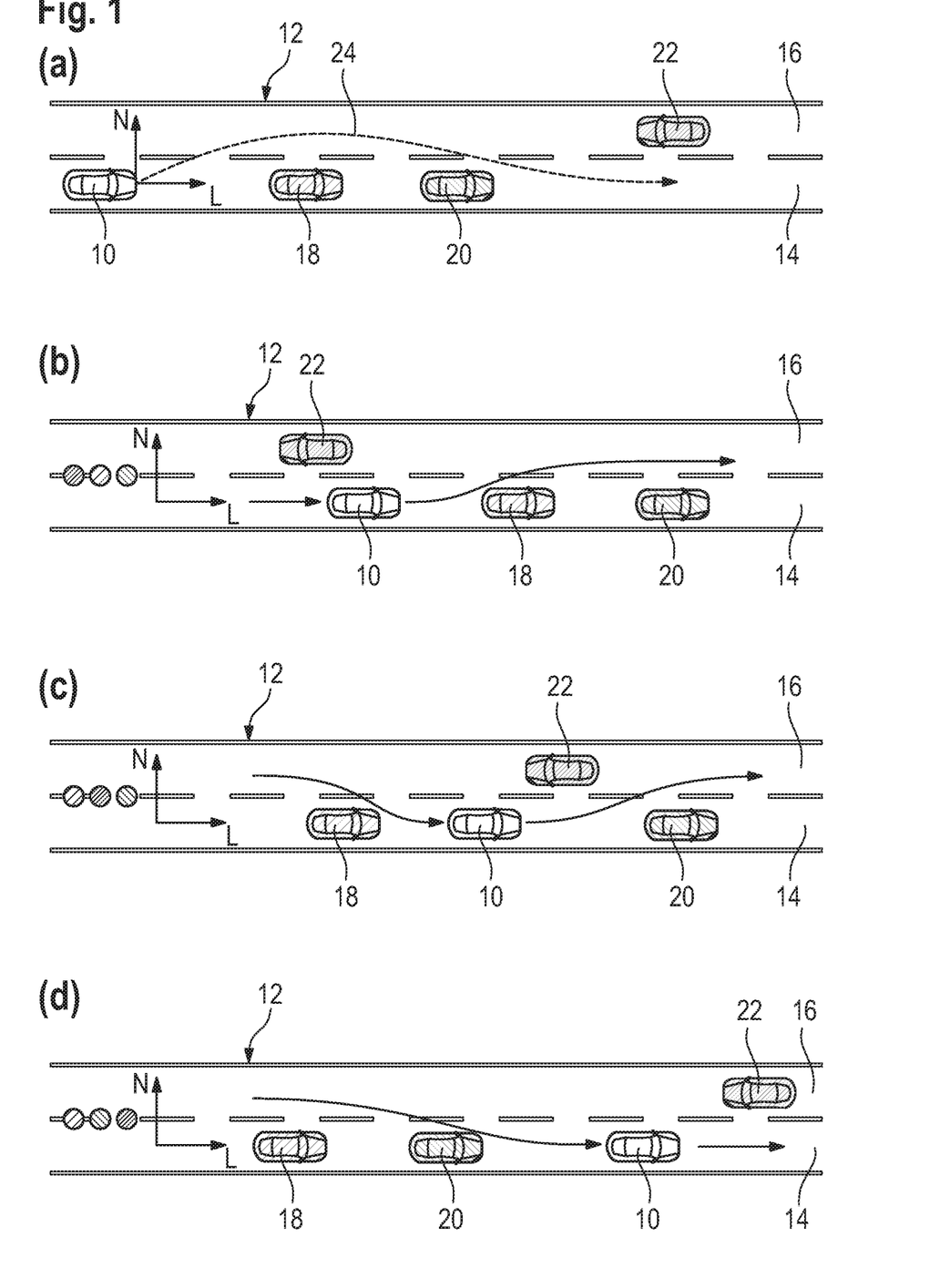
FIG. 1a schematically shows a traffic situation.
FIGS. 1b through 1d show various possible driving maneuvers of a motor vehicle.

FIG. 1 schematically shows a traffic situation in which a motor vehicle 10 is traveling on a roadway 12 in a current lane 14. Next to the current lane 14 is an additional lane 16.

In the example shown in FIG. 1, the additional lane 16 is a lane for oncoming traffic. However, the additional lane may also be a further lane in the travel direction of the motor vehicle 10, for example if the roadway 12 is designed as an expressway.

Also traveling on the roadway 12 in addition to the motor vehicle 10 are a first further road user 18 and a second further road user 20 in the current lane 14, and a third further road user 22 in the additional lane 16. In the example shown, the further road users 18, 20, 22 are passenger vehicles, although they could also be trucks, motorcycles, or any other given road users.

The first further road user 18 and the second further road user 20 are traveling in the same lane as the motor vehicle 10 and in the same direction as the motor vehicle. The third further road user 22 is traveling toward the motor vehicle 10 in the additional lane 16.

FIG. 1 also shows a coordinate system having a longitudinal axis and a perpendicular axis, the longitudinal axis defining a longitudinal direction L and the perpendicular axis defining a transverse direction N. The origin of the coordinate system lies in the longitudinal direction L at the current position of the very front of the motor vehicle 10, and on the right edge of the road, viewed in the longitudinal direction L.

This particular coordinate system, which is also used for the following discussion, is a coordinate system which is fixed to the roadway, and which therefore does not move with the motor vehicle 10. Of course, any other given coordinate system may also be used.

The dashed line 24 indicates that the motor vehicle 10 in the near future is planning to overtake the first further road user 18 and the second further road user 20. As shown in FIGS. 1(b) through 1(d), there are multiple different options for this driving maneuver.

Thus, as shown in FIG. 1(b), the motor vehicle 10 may initially allow the third further road user to travel past before overtaking the first and the second further road user 18, 20.

FIG. 1(c) shows a variant of the driving maneuver according to which the motor vehicle 10 initially overtakes the first further road user 18, then allows the third further road user to travel past, and then overtakes the second further road user 20.

In contrast, FIG. 1(d) shows a variant of the driving maneuver in which the motor vehicle 10 overtakes the first and the second further road user 18, 20 before the third further road user 22 travels past the motor vehicle 10.

The motor vehicle 10 is designed to automatically determine possible driving maneuvers in a given traffic situation, select one of the possible driving maneuvers, and automatically carry out the selected driving maneuver. The driving maneuver variants described above with reference to FIG. 1 are used in the following discussion strictly as an illustrative example.

Figure 2:
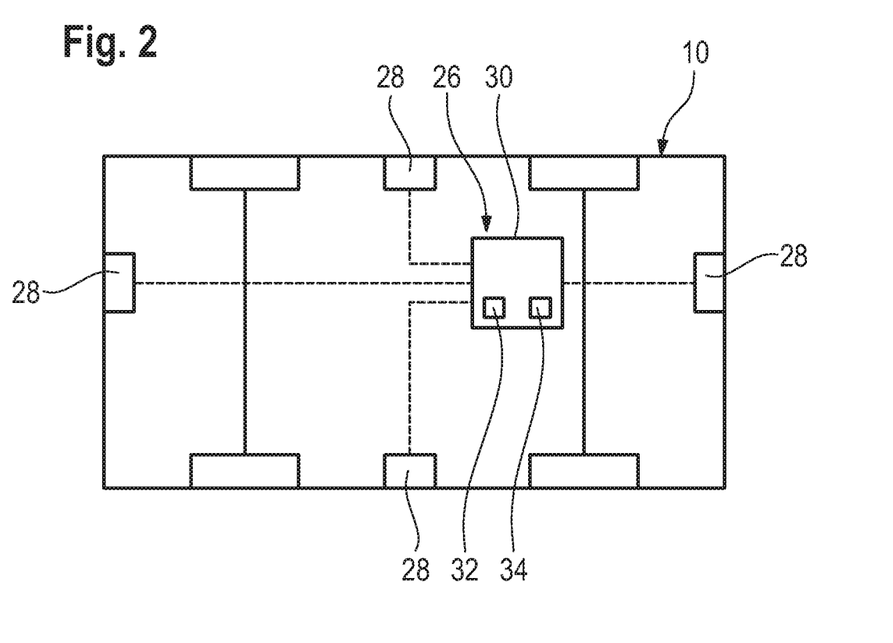
FIG. 2 shows a schematic block diagram of a motor vehicle according to the invention, having a system for controlling the motor vehicle.

As shown in FIG. 2, the motor vehicle 10 has a system 26 for controlling the motor vehicle 10. The system 26 includes multiple sensors 28 and at least one control unit 30.

The sensors 28 are situated at the front, rear and/or sides of the motor vehicle 10, and are designed to detect the surroundings of the motor vehicle 10, generate corresponding surroundings data, and relay the data to the control unit 30. More precisely, the sensors 28 detect information at least concerning the current lane 14, the additional lane 16, and the further road users 18, 20, 22.

The sensors 28 are in each case a camera, a radar sensor, a distance sensor, a lidar sensor, and/or another type of sensor that is suitable for detecting the surroundings of the motor vehicle 10.

Alternatively or additionally, at least one of the sensors 28 may be designed as an interface with a guidance system that is associated at least with the section of the roadway 12 that is shown, and that is designed to transmit surroundings data to the motor vehicle 10 and/or to the further road users 18, 20, 22 via the roadway 12 and/or via the further road users. The one sensor 28 in this case may be designed as a mobile radio communication module, for example for communication according to the 5G standard.

In general, the control unit 30 processes the surroundings data received from the sensors 28 and controls the motor vehicle 10 based on the processed surroundings data, in an at least partially automatic manner, in particular completely automatically. Thus, a driving assistance system is implemented on the control unit 30 which is able to control a transverse motion and/or a longitudinal motion of the motor vehicle 10 in an at least partially automatic manner, in particular completely automatically.

For this purpose, the control unit 30 is designed to carry out the method steps explained below with reference to FIGS. 3 through 7. More precisely, the control unit 30 includes a data medium 32 and a processing unit 34, a computer program being stored on the data medium 32 and being executed on the processing unit 34, and the program code including means for carrying out the steps of the method explained below.

Figure 3:
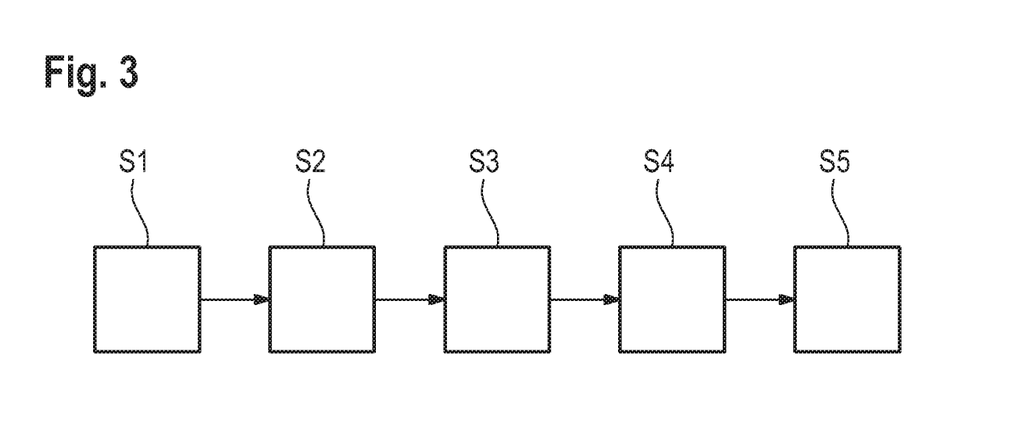
FIG. 3 shows a flow chart of the steps of a method according to the invention.

To allow all driving situations to be treated equally regardless of the current traffic conditions, the roadway 12, more precisely, a representation of the current lane 14 and of the additional lane 16, based on surroundings data obtained from the sensors 28, is transformed into a Frenet-Serret coordinate system (step S1).

Figure 4:
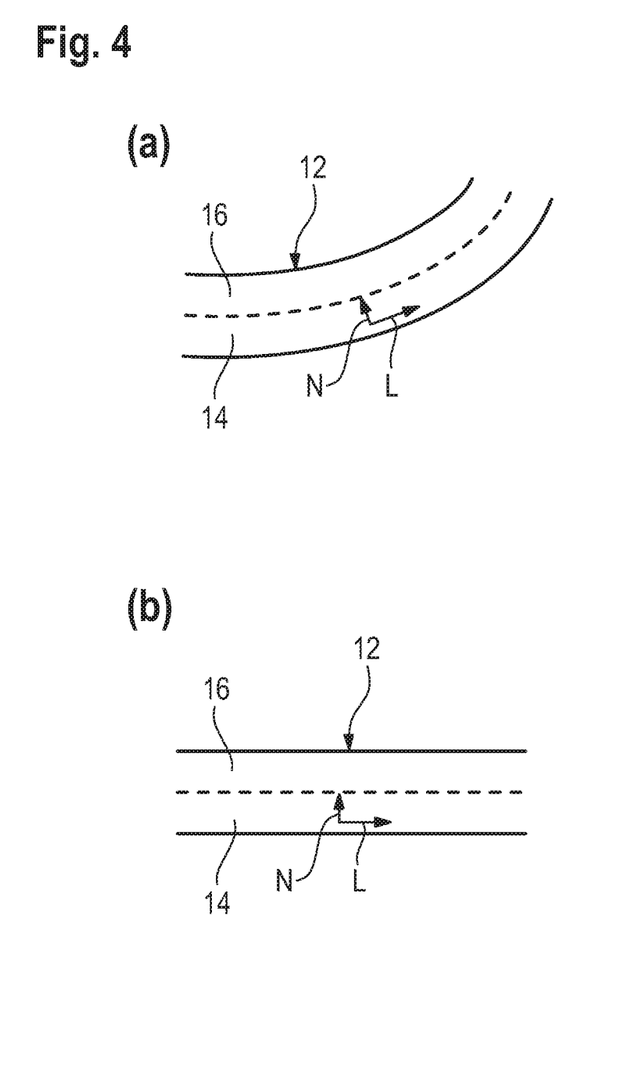
FIGS. 4a and 4b schematically show a roadway prior to a transformation into a Frenet-Serret coordinate system, and after a transformation into a Frenet-Serret coordinate system, respectively.

Step S1 is illustrated in FIG. 4. FIG. 4(a) shows the roadway 12 as it actually runs. In the example shown, the roadway, viewed in the longitudinal direction L, curves to the left. As the result of a local coordinate transformation the roadway 12 is transformed into the Frenet-Serret coordinate system, in which the roadway 12 is no longer curved, the result of this transformation being shown in FIG. 4(b). As is clearly apparent, in this coordinate system the roadway 12 runs straight, without a curve, along the longitudinal direction L.

Multiple different driving maneuvers are now generated and/or received by the control unit 30 (step S2).

Figure 5:
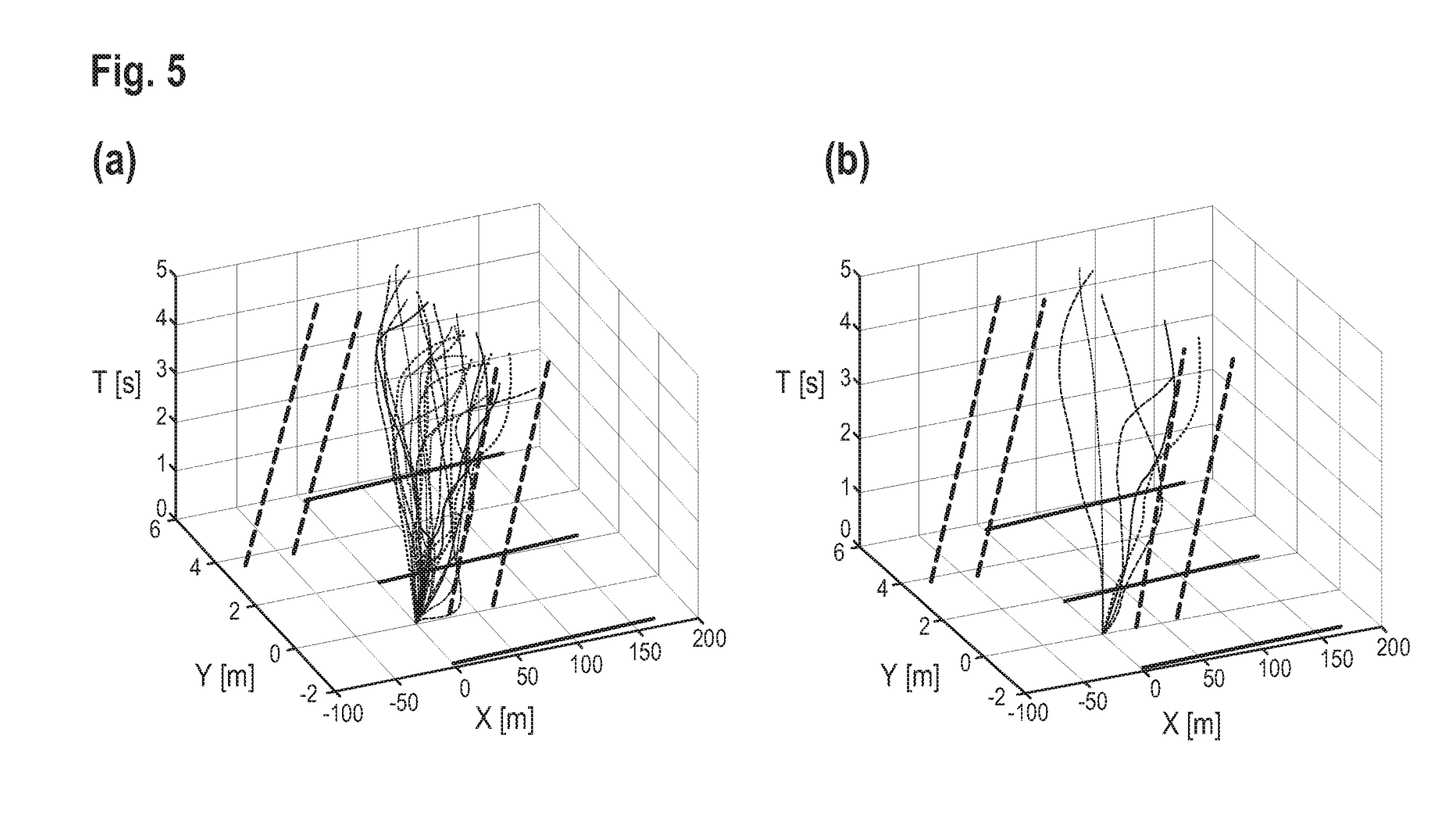
FIGS. 5a and 5b each show a diagram of possible space-time trajectories which in each case correspond to a driving maneuver of the motor vehicle.

As illustrated in FIG. 5, the driving maneuvers are space-time trajectories of the motor vehicle 10, more precisely, space-time trajectories in an X-Y-t coordinate system, where X corresponds to the longitudinal direction L and Y corresponds to the transverse direction N. In particular, these are thus space-time trajectories of the motor vehicle 10 in an L-N-t coordinate system.

The various driving maneuvers are generated randomly, pseudorandomly, or based on a predefined probability distribution. The motor vehicle 10 is represented as a point mass, and accelerations of this point mass are simulated.

Obstacles such as the further road users 18, 20, 22 are taken into account in generating the possible driving maneuvers, and are illustrated by dashed lines in FIG. 5. In particular, the obstacles are taken into account at least insofar as the space-time trajectories of the motor vehicle 10 and the space-time trajectories of the obstacles must not intersect or touch.

In particular, a diffusion strategy is used in step S2 in order to obtain a greater diversity of the driving maneuvers. When the driving maneuvers are generated, those space-time trajectories already having a large number of other space-time trajectories in their vicinity are suppressed. In other words, this diffusion strategy also generates space-time trajectories, and thus, driving maneuvers, in areas in the X-Y-t coordinate system that are less densely populated by driving maneuvers. In this way, a plurality of different possible driving maneuvers are thus obtained in step S2. The result from step S2 is illustrated in FIG. 5(a).

Next, the multiple various driving maneuvers are each classified in one of at least two different driving maneuver classes (step S3).

The driving maneuver classes are defined in each case by a set of characteristic variables. The characteristic variables are variables that describe the essential features of the particular driving maneuver.

The driving maneuver classes are disjunct; i.e., each driving maneuver is associated with only one driving maneuver class. Accordingly, driving maneuvers from two various different maneuver classes differ by at least one characteristic variable, or even by all characteristic variables. Driving maneuvers within a driving maneuver class may differ in one characteristic variable, but not in all characteristic variables.

Conversely, the characteristic variables of the individual possible driving maneuvers that are obtained may be determined in order to classify the driving maneuvers in the various driving maneuver classes The characteristic variables include one or more of the following variables: a traffic sequence, an overtaking sequence, a passing-by sequence, a driving maneuver parameter, and/or information concerning the lane in which the motor vehicle 10 is situated after completion of the driving maneuver in question.

The traffic sequence indicates the time sequence in which the other road users 18, 20, 22 are traveling past the motor vehicle 10.

More precisely, the traffic sequence includes the overtaking sequence, which includes one or more time-ordered points in time at which the motor vehicle 10 is in each case overtaking a further road user (the first and the second further road user 18, 20 in the example in FIG. 1).

In addition, the traffic sequence includes the passing-by sequence, which includes one or more time-ordered points in time at which other road users (the third further road user 22 in the example in FIG. 1) are traveling past the motor vehicle 10.

Furthermore, the passing-by sequence also includes the information concerning whether the further road users are traveling past the motor vehicle 10 in the opposite direction or in the travel direction of the motor vehicle 10.

In the example shown in FIG. 1, the information concerning the lane in which the motor vehicle 10 is situated after completion of the driving maneuver in question indicates whether the motor vehicle 10 is once again situated in the current lane 14, or instead in the additional lane 16, after completion of the driving maneuver.

The driving maneuver parameter includes information concerning whether the motor vehicle 10 is overtaking the particular further road user on the left, is overtaking the particular further road user on the right, is traveling behind the particular further road user, is traveling in front of the particular further road user, or whether the at least one further road user is traveling past the motor vehicle 10 in the opposite direction or in the travel direction of the motor vehicle 10.

Figure 6:
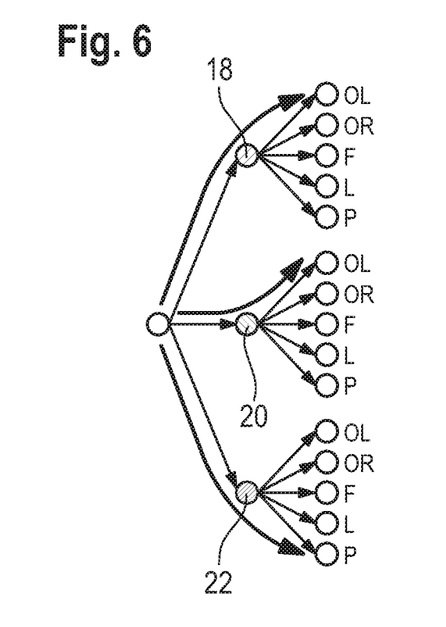
FIG. 6 schematically shows a decision tree representation of a driving maneuver parameter.

FIG. 6 illustrates the driving maneuver parameter for the example from FIG. 1. The driving maneuver parameter is represented here as a decision tree, which for the three further road users 18, 20, 22 indicates in each case whether the motor vehicle 10 is overtaking them on fhe left (OL), overtaking them on fhe right (OR), traveling behind them (F), traveling in front of them (L), or whether they are traveling past the motor vehicle in the opposite direction or in the travel direction of the motor vehicle 10 (P).

In order to determine one or more of the characteristic variables and to classify the driving maneuvers, a homotopy analysis of the multiple driving maneuvers, more precisely, of the space-time trajectories corresponding to the multiple driving maneuvers, is preferably carried out.

In other words, those driving maneuvers whose associated space-time trajectories are homotopic relative to one another are classified in the same driving maneuver classes.

In contrast, driving maneuvers whose associated space-time trajectories are not homotopic relative to one another are classified in different driving maneuver classes.

Figure 7:
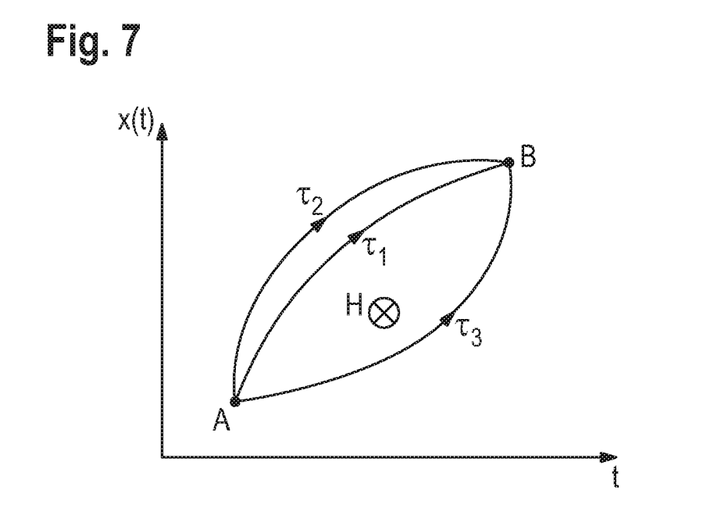
FIG. 7 shows an illustration of a homotopy analysis according to the method according to the invention.

FIG. 7 shows an illustration of the homotopy analysis that is simplified to two dimensions. In the figure, $\tau_1$, $\tau_2$, and $\tau_3$ denote three space-time trajectories, each of which joins points A and B together. In addition, an obstacle H is present through which the trajectories $\tau_1$, $\tau_2$, $\tau_3$ are not allowed to extend.

The trajectories $\tau_1$ and $\tau_2$ are homotopic relative to one another, since they may be continuously deformed into one another, i.e., transformed into one another, without crossing an obstacle. Therefore, the trajectories $\tau_1$ and $\tau_2$ are classified in the same driving maneuver class.

In contrast, $\tau_3$ is not homotopic relative to $\tau_1$ and $\tau_2$, since $\tau_3$ cannot be continuously transformed into $\tau_1$ or $\tau_2$ without crossing the obstacle H. Therefore, the trajectory $\tau_3$ is classified in a different driving maneuver class than $\tau_1$ and $\tau_2$.

One specific option for the homotopy analysis is provided by the following steps:

A space-time trajectory is initially associated with each obstacle. In addition, a hypothetical current having a predefined current intensity is sent through each of the space-time trajectories of the obstacles, the current intensities being the same for all space-time trajectories of the obstacles.

For the space-time trajectories $\tau_i$, each of which corresponds to a driving maneuver, the so-called h signature $h(\tau_i)$ is then determined, which as a line integral is defined via the magnetic field B, generated by the hypothetical currents, along $\tau_1$:

$$h(\tau_i) = \int_{\tau_i} B(\vec{l}) \cdot d\vec{l}.$$

It has been found that space-time trajectories $\tau_i$ that belong to the same homotopy class, and thus to the same driving maneuver class, have the same h signature. Accordingly, the various generated driving maneuvers may be classified in the driving maneuver classes by determining their h signature.

From each driving maneuver class, one, in particular exactly one, representative space-time trajectory together with the corresponding characteristic variables is now stored on the data medium 32 (step S4) and optionally relayed to an optimization and decision module of the control unit 30. The result from step S4 is shown in FIG. 5(*b*).

The optimization and decision module then optionally optimizes one of the representative driving maneuvers and/or selects one of the representative driving maneuvers, according to which the motor vehicle 10 is then automatically controlled by the control unit 30 (step S5).

For this purpose, it may be provided that the representative driving maneuvers are also filtered based on predefined criteria, i.e., removed before or after the optimization.

The predefined criteria are feasibility criteria, comfort criteria, and/or safety criteria.

One example of a feasibility criterion is whether the motor vehicle can even reach a certain space-time region based on a maximum acceleration or a maximum deceleration of the motor vehicle.

One example of a comfort criterion is whether the acceleration in the longitudinal and/or transverse direction exceeds a predefined limit value which, based on experience, is perceived as uncomfortable by the vehicle occupants.

One example of a safety criterion is a minimum distance to be maintained from other road users, or a speed limit.

The invention claimed is:

1. A method for controlling a motor vehicle (10) traveling on a roadway (12) in a current lane (14), wherein the roadway (12) has at least one additional lane (16) that is adjacent to the current lane (14) of the motor vehicle (10), having the following steps:
generating and/or receiving multiple different driving maneuvers each joining common points (A, B) together;
determining at least two driving maneuver classes that are defined based on at least one characteristic variable of the driving maneuvers, wherein the driving maneuvers of various driving maneuver classes differ by at least one characteristic variable;
classifying the driving maneuvers joining the common points (A, B) together in one of the at least two driving maneuver classes, wherein a homotopy analysis of the multiple driving maneuvers is carried out in order to assign the multiple driving maneuvers to a driving maneuver class and/or to determine a driving maneuver parameter of the at least one characteristic variable, wherein the driving maneuvers that can be transformed into one another without crossing an obstacle are classified in the same driving maneuver class;
selecting one of the possible driving maneuvers based on the classification; and
controlling the motor vehicle (10) according to the selected driving maneuver.

2. The method according to claim 1, wherein at least one characteristic variable includes at least one traffic sequence that indicates the time sequence of traveling past and/or overtaking by other road users.

3. The method according to claim 2, wherein the at least one traffic sequence includes an overtaking sequence, wherein the overtaking sequence includes at least one point in time at which the motor vehicle (10) is overtaking a further road user (18, 20).

4. The method according to claim 3, wherein the overtaking sequence includes multiple time-ordered points in time at which the motor vehicle (10) is in each case overtaking a further road user (18, 20).

5. The method according to claim 2, wherein the at least one traffic sequence includes a passing-by sequence, wherein the passing-by sequence includes at least one point in time at which a further road user (22) is traveling past the motor vehicle in the opposite direction or in the travel direction.

6. The method according to claim 5, wherein the passing-by sequence (22) includes multiple time-ordered points in time at which a further road user (22) is in each case traveling past the motor vehicle (10) in the opposite direction or in the travel direction.

7. The method according to claim 1, wherein the at least one characteristic variable includes information concerning a lane in which the motor vehicle (10) is situated after completion of the driving maneuver.

8. The method according to claim 1, wherein the driving maneuver parameter contains information at least concerning whether the motor vehicle (10) is overtaking the at least one further road user (18, 20, 22) on the left, is overtaking the at least one further road user (18, 20, 22) on the right, is traveling behind the at least one further road user (18, 20, 22), is traveling in front of the at least one further road user (18, 20, 22), or whether the at least one further road user (18, 20, 22) is traveling past the motor vehicle (10).

9. The method according to claim 1, wherein the multiple different driving maneuvers are generated randomly, pseudorandomly, and/or based on a predefined probability distribution.

10. The method according to claim 1, wherein at least the current lane (14) and/or the at least one additional lane (16) are/is transformed into a Frenet-Serret coordinate system.

11. The method according to claim 1, wherein the multiple different driving maneuvers and/or the driving maneuver classes are filtered based on at least one feasibility criterion, at least one comfort criterion, and/or at least one safety criterion.

12. The method according to claim 1, wherein driving maneuvers that belong to the same homotopy class are grouped in the same driving maneuver class and driving maneuvers that are not in the same homotopy class are grouped in a different driving maneuver class.

13. The method according to claim 1, wherein the driving maneuvers that cannot be transformed into one another without crossing the obstacle are classified in a separate driving maneuver class than the driving maneuvers that can be transformed into one another without crossing the obstacle.

14. A control unit (30) for a system (26) for controlling a motor vehicle (10) or for a motor vehicle (10), wherein the control unit (30) is designed to carry out a method according to claim 1.

15. A motor vehicle (10) having a control unit (30) according to claim 14.

16. A computer program having program code means for carrying out the steps of a method according to claim 1 when the computer program is executed on a computer or a processing unit (34) of a control unit (30) designed to carry out the method according to claim 1.

\* \* \* \* \*